C. BIRD & W. H. SULLENBERGER.
Bearings for Shafts.

No. 141,986.                        Patented August 19, 1873.

WITNESSES. Harry Smith
Thomas McIlvain

W. H. Sullenberger
Charles Bird
by their Attys.
Howson and Son

UNITED STATES PATENT OFFICE.

CHARLES BIRD, OF LOWER MERION TOWNSHIP, MONTGOMERY COUNTY, AND WILLIAM H. SULLENBERGER, OF HARRISBURG, PA.

IMPROVEMENT IN BEARINGS FOR SHAFTS.

Specification forming part of Letters Patent No. 141,986, dated August 19, 1873; application filed August 1, 1873.

*To all whom it may concern:*

Figure 1:
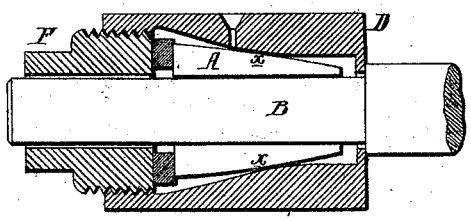
Figure 3:
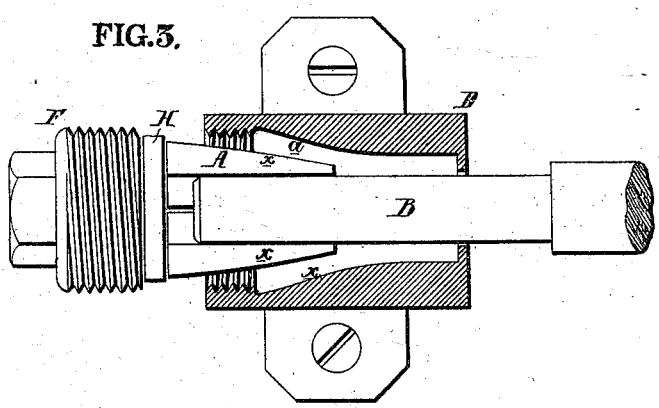
Figure 2:
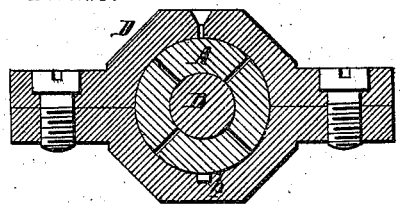

Be it known that we, CHARLES BIRD, of Lower Merion, Montgomery county, and WILLIAM H. SULLENBERGER, of Harrisburg, Dauphin county, Pennsylvania, have invented an Improvement in Bearings, of which the following is a specification:

The main object of our invention is to enable the bearings of shafts and axles to be readily tightened upon the journals from time to time, in order to overcome the effects of wear; and we accomplish this object in the manner plainly shown in the sectional views, Figures 1 and 2, by forming the bearings or packing in two or more wedge-shaped sections, A, so adapted to the journal B, and to a conical opening, a, in the casing D, that they can be forced or wedged into the latter, and thus tightened upon the journal by simply turning a screw-plug, F, which bears against the rear ends of the said sections, and the threaded portion of which is adapted to a corresponding thread in the casing. A further object of our invention is to prevent the undue wearing away and heating of the conical bearing or packing and journal, owing to slight vibrations and variations of the angle of the latter in respect to the bearing; and this object we accomplish either by slightly rounding the outer surfaces $x$ of the bearing-pieces, or the interior of the casing D, or both, as illustrated in the sectional plan, Fig. 3, so that the said bearing may be self-accommodating to the journal without being loosened upon the latter.

This curving of the bearing-pieces and interior of the casing will not, however, be absolutely necessary for shafting when the latter can be set with perfect truth, so as not to be likely to vibrate to any appreciable degree. In such case the conical packing and interior of the casing can be perfectly straight and snugly fitted together.

A loose washer, H, interposed between the screw-plug F and packing, prevents the turning of the latter by the said screw-plug, and the sections of packing are provided with one or more projections, $b$, adapted to corresponding longitudinal slots in the casing D, (see Fig. 2,) which prevents the said packing from being turned within the casing by the rotation of the journal.

In some cases the washer H may be threaded and screwed in before the plug, the latter then serving as a jam-nut. The screw-plug F might be adapted to external instead of to internal threads in the casing D; but in such case it would have to be provided with a central projection for bearing against the ends of the bearing-pieces or the interposed washer. By simply screwing in the said screw-plug F the bearing-pieces can be wedged upon and caused to snugly embrace the journal, and after having been worn down to a mere shell the said bearing-pieces can be readily removed and replaced by new ones.

Our invention, it will be evident, is as applicable to shafts or rods which have a longitudinal, or combined longitudinal and rotary, movement through their bearings as to shafts which simply rotate.

We claim as our invention—

1. The combination of the rod or journal B, conical bearing or packing A, conical recessed casing D, and screw-plug F.

2. The combination, with the case D, the packing A, and ring F, of the washer H, for the purpose described.

3. The curving of the surfaces $x$ of the wedge-shaped sectional bearing, or of the interior of the casing, or of both, for the purpose set forth.

In testimony whereof we have signed our names to this specification in the presence of two subscribing witnesses.

CHAS. BIRD.
  WM. H. SULLENBERGER.

Witnesses:
 GEO. B. COLE,
 H. M. KOLLER.